United States Patent
Liu

(10) Patent No.: US 8,249,280 B2
(45) Date of Patent: *Aug. 21, 2012

(54) THERMOACOUSTIC DEVICE

(75) Inventor: Liang Liu, Beijing (CN)

(73) Assignee: Beijing FUNATE Innovation Technology Co., Ltd., Beijing (CN)

( * ) Notice: Subject to any disclaimer, the term of this patent is extended or adjusted under 35 U.S.C. 154(b) by 292 days.

This patent is subject to a terminal disclaimer.

(21) Appl. No.: 12/661,131

(22) Filed: Mar. 11, 2010

(65) Prior Publication Data

US 2011/0075519 A1    Mar. 31, 2011

(30) Foreign Application Priority Data

Sep. 25, 2009   (CN) ........................ 2009 1 0176978

(51) Int. Cl.
*H04R 25/00* (2006.01)

(52) U.S. Cl. ........................... 381/164; 381/394

(58) Field of Classification Search ............... 381/164, 381/190, 191, 388, 394
See application file for complete search history.

(56) References Cited

U.S. PATENT DOCUMENTS

| | | | |
|---|---|---|---|
| 1,528,774 A | 3/1925 | Kranz | |
| 4,002,897 A | 1/1977 | Kleinman et al. | |
| 4,160,882 A * | 7/1979 | Driver | 381/116 |
| 4,334,321 A | 6/1982 | Edelman | |
| 4,503,564 A | 3/1985 | Edelman et al. | |
| 4,641,377 A | 2/1987 | Rush et al. | |
| 4,766,607 A | 8/1988 | Feldman | |
| 5,694,477 A | 12/1997 | Kole | |
| 6,473,625 B1 | 10/2002 | Williams et al. | |
| 6,777,637 B2 | 8/2004 | Nakayama et al. | |
| 6,803,116 B2 | 10/2004 | Ikeda | |
| 6,808,746 B1 | 10/2004 | Dai et al. | |
| 6,921,575 B2 | 7/2005 | Horiuchi et al. | |
| 7,045,108 B2 | 5/2006 | Jiang et al. | |
| 7,144,830 B2 * | 12/2006 | Hill et al. | 442/205 |

(Continued)

FOREIGN PATENT DOCUMENTS

CN         2302622        12/1998

(Continued)

OTHER PUBLICATIONS

Lina Zhang, Chen Feng, Zhuo Chen, Liang Liu et al., Superaligned Carbon Nanotube Grid for High Resolution Transmission Electron Microscopy of Nanomaterials, Nano Letters, 2008, pp. 2564-2569, vol. 8, No. 8.

(Continued)

*Primary Examiner* — Curtis Kuntz
*Assistant Examiner* — Ryan Robinson
(74) *Attorney, Agent, or Firm* — Altis Law Group, Inc.

(57) ABSTRACT

A thermoacoustic device includes a sound wave generator, a plurality of first electrodes, a plurality of second electrodes, a first network and a second network. The sound wave generator includes a first surface and a second surface. The plurality of first electrodes are disposed on the first surface. The plurality of second electrodes are disposed on the second surface. The first electrodes and the second electrodes are alternately arranged. Each of the first network and the second network includes a plurality of conducting wires. The plurality of first electrodes are connected together by the plurality of conducting wires in the first network. The plurality of second electrodes are connected together by the plurality of conducting wires in the second network.

18 Claims, 14 Drawing Sheets

U.S. PATENT DOCUMENTS

| | | | |
|---|---|---|---|
| 7,393,428 | B2 | 7/2008 | Huang et al. |
| 7,474,590 | B2 | 1/2009 | Watabe et al. |
| 7,723,684 | B1 | 5/2010 | Haddon et al. |
| 7,799,163 | B1 | 9/2010 | Mau et al. |
| 2001/0005272 | A1 | 6/2001 | Buchholz |
| 2001/0048256 | A1 | 12/2001 | Miyazaki et al. |
| 2002/0076070 | A1 | 6/2002 | Yoshikawa et al. |
| 2003/0038925 | A1 | 2/2003 | Choi |
| 2003/0165249 | A1 | 9/2003 | Higuchi |
| 2004/0053780 | A1 | 3/2004 | Jiang et al. |
| 2005/0040371 | A1 | 2/2005 | Watanabe et al. |
| 2005/0201575 | A1 | 9/2005 | Koshida et al. |
| 2006/0072770 | A1 | 4/2006 | Miyazaki |
| 2006/0104451 | A1 | 5/2006 | Browning et al. |
| 2006/0147081 | A1 | 7/2006 | Mango, III et al. |
| 2006/0264717 | A1 | 11/2006 | Pesach et al. |
| 2007/0145335 | A1 | 6/2007 | Anazawa |
| 2007/0164632 | A1 | 7/2007 | Adachi et al. |
| 2007/0166223 | A1 | 7/2007 | Jiang et al. |
| 2007/0176498 | A1 | 8/2007 | Sugiura et al. |
| 2008/0063860 | A1 | 3/2008 | Song et al. |
| 2008/0095694 | A1* | 4/2008 | Nakayama et al. ....... 423/445 B |
| 2008/0170982 | A1 | 7/2008 | Zhang et al. |
| 2008/0248235 | A1 | 10/2008 | Feng et al. |
| 2008/0260188 | A1 | 10/2008 | Kim |
| 2008/0299031 | A1 | 12/2008 | Liu et al. |
| 2009/0016951 | A1 | 1/2009 | Kawabata et al. |
| 2009/0028002 | A1 | 1/2009 | Sugiura et al. |
| 2009/0045005 | A1 | 2/2009 | Byon et al. |
| 2009/0085461 | A1 | 4/2009 | Feng et al. |
| 2009/0087002 | A1* | 4/2009 | Nakaya et al. ................ 381/191 |
| 2009/0096346 | A1 | 4/2009 | Liu et al. |
| 2009/0096348 | A1 | 4/2009 | Liu et al. |
| 2009/0145686 | A1 | 6/2009 | Watabe et al. |
| 2009/0153012 | A1 | 6/2009 | Liu et al. |
| 2009/0167136 | A1 | 7/2009 | Liu et al. |
| 2009/0167137 | A1 | 7/2009 | Liu et al. |
| 2009/0196981 | A1 | 8/2009 | Liu et al. |
| 2009/0232336 | A1 | 9/2009 | Pahl |
| 2010/0054502 | A1 | 3/2010 | Miyachi |
| 2010/0054507 | A1 | 3/2010 | Oh et al. |
| 2010/0086166 | A1 | 4/2010 | Jiang et al. |
| 2010/0166232 | A1 | 7/2010 | Liu et al. |
| 2010/0233472 | A1 | 9/2010 | Liu et al. |
| 2011/0171419 | A1 | 7/2011 | Li et al. |

FOREIGN PATENT DOCUMENTS

| | | |
|---|---|---|
| CN | 2425468 | 3/2001 |
| CN | 1407392 | 4/2003 |
| CN | 1443021 | 9/2003 |
| CN | 1698400 | 11/2005 |
| CN | 2779422 Y | 5/2006 |
| CN | 1787696 | 6/2006 |
| CN | 2787870 | 6/2006 |
| CN | 2798479 | 7/2006 |
| CN | 1821048 | 8/2006 |
| CN | 1886820 | 12/2006 |
| CN | 1944829 | 4/2007 |
| CN | 1982209 | 6/2007 |
| CN | 1997243 | 7/2007 |
| CN | 101239712 | 8/2008 |
| CN | 101284662 | 10/2008 |
| CN | 201150134 | 11/2008 |
| CN | 101314464 | 12/2008 |
| CN | 101471213 | 7/2009 |
| CN | 101715155 | 5/2010 |
| CN | 101400198 | 9/2010 |
| JP | 49-24593 | 3/1974 |
| JP | 58-9822 | 1/1983 |
| JP | 60-22900 | 2/1985 |
| JP | 1-255398 | 10/1989 |
| JP | 3-147497 | 6/1991 |
| JP | 4-126489 | 4/1992 |
| JP | 7-282961 | 10/1995 |
| JP | 9-105788 | 4/1997 |
| JP | 11-282473 | 10/1999 |
| JP | 11-300274 | 11/1999 |
| JP | 2001333493 | 11/2001 |
| JP | 2002-186097 | 6/2002 |
| JP | 2002-352940 | 12/2002 |
| JP | 2002346996 | 12/2002 |
| JP | 2002542136 | 12/2002 |
| JP | 2003500325 | 1/2003 |
| JP | 2003-154312 | 5/2003 |
| JP | 2003198281 | 7/2003 |
| JP | 2003-266399 | 9/2003 |
| JP | 2003-319490 | 11/2003 |
| JP | 2003-319491 | 11/2003 |
| JP | 2003-332266 | 11/2003 |
| JP | 20042103 | 1/2004 |
| JP | 2004-107196 | 4/2004 |
| JP | 2004229250 | 8/2004 |
| JP | 2005-20315 | 1/2005 |
| JP | 2005-51284 | 2/2005 |
| JP | 2005-73197 | 3/2005 |
| JP | 2005-97046 | 4/2005 |
| JP | 2005189322 | 7/2005 |
| JP | 2005-235672 | 9/2005 |
| JP | 2005-318040 | 11/2005 |
| JP | 2005-534515 | 11/2005 |
| JP | 2005-341554 | 12/2005 |
| JP | 2005333601 | 12/2005 |
| JP | 2006-93932 | 4/2006 |
| JP | 2006-180082 | 7/2006 |
| JP | 2006-202770 | 8/2006 |
| JP | 2006-217059 | 8/2006 |
| JP | 2006270041 | 10/2006 |
| JP | 2007-24688 | 2/2007 |
| JP | 2007-54831 | 3/2007 |
| JP | 2007-167118 | 7/2007 |
| JP | 2007-174220 | 7/2007 |
| JP | 2007-187976 | 7/2007 |
| JP | 2007-196195 | 8/2007 |
| JP | 2007-228299 | 9/2007 |
| JP | 2007-527099 | 9/2007 |
| JP | 2008-62644 | 3/2008 |
| JP | 2008-101910 | 5/2008 |
| JP | 2008-163535 | 7/2008 |
| JP | 2008-269914 | 11/2008 |
| JP | 2009-31031 | 2/2009 |
| JP | 2009-91239 | 4/2009 |
| JP | 2009-94074 | 4/2009 |
| JP | 2009-146896 | 7/2009 |
| JP | 2009-146898 | 7/2009 |
| JP | 2009-164125 | 7/2009 |
| JP | 2009-184907 | 8/2009 |
| JP | 2009-184908 | 8/2009 |
| KR | 10-0761548 | 9/2007 |
| TW | 200740976 | 11/2007 |
| TW | 200744399 | 12/2007 |
| TW | 201029481 | 8/2010 |
| WO | WO0073204 | 12/2000 |
| WO | WO2004012932 | 2/2004 |
| WO | WO2005102924 | 11/2005 |
| WO | WO2005120130 | 12/2005 |
| WO | WO2007043837 | 4/2007 |
| WO | WO2007049496 | 5/2007 |
| WO | WO2007052928 | 5/2007 |
| WO | WO2007099975 | 9/2007 |
| WO | WO2007111107 | 10/2007 |
| WO | WO2008/029451 | 3/2008 |

OTHER PUBLICATIONS

Swift Gregory W., Thermoacoustic Engines and Refrigerators, Physics Today, Jul. 1995, pp. 22-28, vol. 48.

Kaili Jiang, Qunqing Li, Shoushan Fan, Spinning continuous carbon nanotube yarns, Nature, Oct. 24, 2002, pp. 801, vol. 419.

Yang Wei, Kaili Jiang, Xiaofeng Feng, Peng Liu et al., Comparative studies of multiwalled carbon nanotube sheets before and after shrinking, Physical Review B, Jul. 25, 2007, vol. 76, 045423.

Lin Xiao, Zhuo Chen, Chen Feng, Liang Liu et al., Flexible, Stretchable, Transparent Carbon Nanotube Thin Film Loudspeakers, Nano Letters, 2008, pp. 4539-4545, vol. 8, No. 12, US.

W. Yi, L.Lu, Zhang Dianlin et al., Linear Specific Heat of Carbon Nanotubes, Physical Review B, Apr. 1, 1999, vol. 59, No. 14, R9015-9018.

Strutt John William, Rayleigh Baron, The Theory of Sound, 1926, pp. 226-235, vol. 2.

H.D. Arnold, I.B. Crandall, The Thermophone as a Precision Source of Sound, Physical Review, 1917, pp. 22-38, vol. 10.

Frank P. Incropera, David P. Dewitt et al., Fundamentals of Heat and Mass Transfer, 6th ed., 2007, pp. A-5, Wiley:Asia.

P. De Lange, On Thermophones, Proceedings of the Royal Society of London. Series A, Apr. 1 1915, pp. 239-241, vol. 91, No. 628.

Kai Liu, Yinghui Sun, Lei Chen, Chen Feng, Xiaofeng Feng, Kaili Jiang et al., Controlled Growth of Super-Aligned Carbon Nanotube Arrays for Spinning Continuous Unidirectional Sheets with Tunable Physical Properties, Nano Letters, 2008, pp. 700-705, vol. 8, No. 2.

Braun Ferdinand, Notiz uber Thermophonie, Ann. Der Physik, Apr. 1898, pp. 358-360, vol. 65.

Zhuangchun Wu, Zhihong Chen, Xu Du et al.,Transparent, Conductive Carbon Nanotube Films, Science, Aug. 27, 2004, pp. 1273-1276, vol. 305.

Xiaobo Zhang, Kaili Jiang, Chen Feng, Peng Liu et al., Spinning and Processing Continuous Yarns from 4-Inch Wafer Scale Super-Aligned Carbon Nanotube Arrays, Advanced Materials, 2006, pp. 1505-1510, vol. 18.

Edward C. Wente, The Thermophone, Physical Review, 1922, pp. 333-345,vol. 19.

William Henry Preece, On Some Thermal Effects of Electric Currents, Proceedings of the Royal Society of London, 1879-1880, pp. 408-411, vol. 30.

J.J.Hopfield, Spectra of Hydrogen, Nitrogen and Oxygen in the Extreme Ultraviolet, Physical Review, 1922, pp. 573-588,vol. 20.

Mei Zhang, Shaoli Fang, Anvar A. Zakhidov, Sergey B. Lee et al., Strong, Transparent, Multifunctional, Carbon Nanotube Sheets, Science, Aug. 19, 2005, pp. 1215-1219, vol. 309.

Silvanus P. Thompson, The Photophone, Nature, Sep. 23, 1880, vol. XXII, No. 569, pp. 481.

Alexander Graham Bell, Selenium and the Photophone, Nature, Sep. 23, 1880, pp. 500-503.

Lee et al., Photosensitization of nonlinear scattering and photoacoustic emission from single-walled carbon nanotubes, Applied Physics Letters, Mar. 13, 2008, 92, 103122.

Chen, Huxiong; Diebold, Gerald, "Chemical Generation of Acoustic Waves: A Giant Photoacoustic Effect", Nov. 10, 1995, Science, vol. 270, pp. 963-966.

Amos, S.W.; "Principles of Transistor Circuits"; 2000; Newnes-Butterworth-Heinemann; 9th ed.;p. 114.

* cited by examiner

THERMOACOUSTIC DEVICE

CROSS-REFERENCE TO RELATED APPLICATIONS

This application claims all benefits accruing under 35 U.S.C. §119 from China Patent Application No. 200910176978.2, filed on Sep. 25, 2009, in the China Intellectual Property Office.

BACKGROUND

1. Technical Field

The present disclosure relates to acoustic devices and, particularly, to a thermoacoustic device.

2. Description of Related Art

An acoustic device generally includes a signal device and a sound wave generator. The signal device provides electrical signals to the sound wave generator. The sound wave generator receives the electrical signals and then transforms them into sounds. The sound wave generator is usually a loudspeaker that can emit sound audible to humans.

There are different types of loudspeakers that can be categorized according to their working principles, such as electro-dynamic loudspeakers, electromagnetic loudspeakers, electrostatic loudspeakers and piezoelectric loudspeakers. However, the various types ultimately use mechanical vibration to produce sound waves, in other words they all achieve "electro-mechanical-acoustic" conversion. Among the various types, the electro-dynamic loudspeakers are most widely used. However, the electro-dynamic loudspeakers are dependent on magnetic fields and often weighty magnets. The structures of the electric-dynamic loudspeakers are complicated. The magnet of the electric-dynamic loudspeakers may interfere or even damage other electrical devices near the loudspeakers.

Thermoacoustic effect is a conversion of heat into acoustic signals. The thermoacoustic effect is distinct from the mechanism of the conventional loudspeaker, in which the pressure waves are created by the mechanical movement of the diaphragm. When signals are supplied to a thermoacoustic element, heat is produced in the thermoacoustic element according to the variations of the signal and/or signal strength. The heat propagates into surrounding medium. The heating of the medium causes thermal expansion and produces pressure waves in the surrounding medium, resulting in sound wave generation. Such an acoustic effect induced by temperature waves is commonly called "the thermoacoustic effect".

A thermophone based on the thermoacoustic effect was created by H. D. Arnold and I. B. Crandall (H. D. Arnold and I. B. Crandall, "The thermophone as a precision source of sound", Phys. Rev. 10, pp 22-38 (1917)). They used platinum strip with a thickness of $7 \times 10^{-5}$ cm as a thermoacoustic element. The heat capacity per unit area of the platinum strip with the thickness of $7 \times 10^{-5}$ cm is $2 \times 10^{-4}$ J/cm$^2$*K. However, the thermophone adopting the platinum strip, listened to the open air, sounds extremely weak because the heat capacity per unit area of the platinum strip is too high.

Carbon nanotubes (CNT) are a novel carbonaceous material having extremely small size and extremely large specific surface area. Carbon nanotubes have received a great deal of interest since the early 1990s, and have interesting and potentially useful electrical and mechanical properties, and have been widely used in a plurality of fields. Xiao et al. discloses an thermoacoustic device with simpler structure and smaller size, working without the magnet in an article of "Flexible, Stretchable, Transparent Carbon Nanotube Thin Film Loudspeakers", Xiao et al., Nano Letters, Vol. 8 (12), 4539-4545 (2008). The thermoacoustic device includes a sound wave generator which is a carbon nanotube film. The carbon nanotube film used in the thermoacoustic device has a large specific surface area, and extremely small heat capacity per unit area that make the sound wave generator emit sound audible to humans. Accordingly, the thermoacoustic device adopted the carbon nanotube film has a potential to be actually used instead of the loudspeakers in prior art. Further, the carbon nanotube film is flexible and can be disposed on an insulating flexible substrate, such as a flag as disclosed in Xiao's article, and can be cut into desired shapes with the substrate.

However, two electrodes are included in the thermoacoustic device to input electrical signals to the sound wave generator. Therefore, although the carbon nanotube film can be freely cut along any direction into any desired shapes, the thermoacoustic device cannot be freely cut along some directions, but to insure that there are still two electrodes connected to the carbon nanotube film after the cutting.

What is needed, therefore, is to provide a thermoacoustic device that can be freely cut along any direction into any desired shapes.

BRIEF DESCRIPTION OF THE DRAWINGS

Many aspects of the embodiments can be better understood with reference to the following drawings. The components in the drawings are not necessarily drawn to scale, the emphasis instead being placed upon clearly illustrating the principles of the embodiments. Moreover, in the drawings, like reference numerals designate corresponding parts throughout the several views.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

Figure 1:
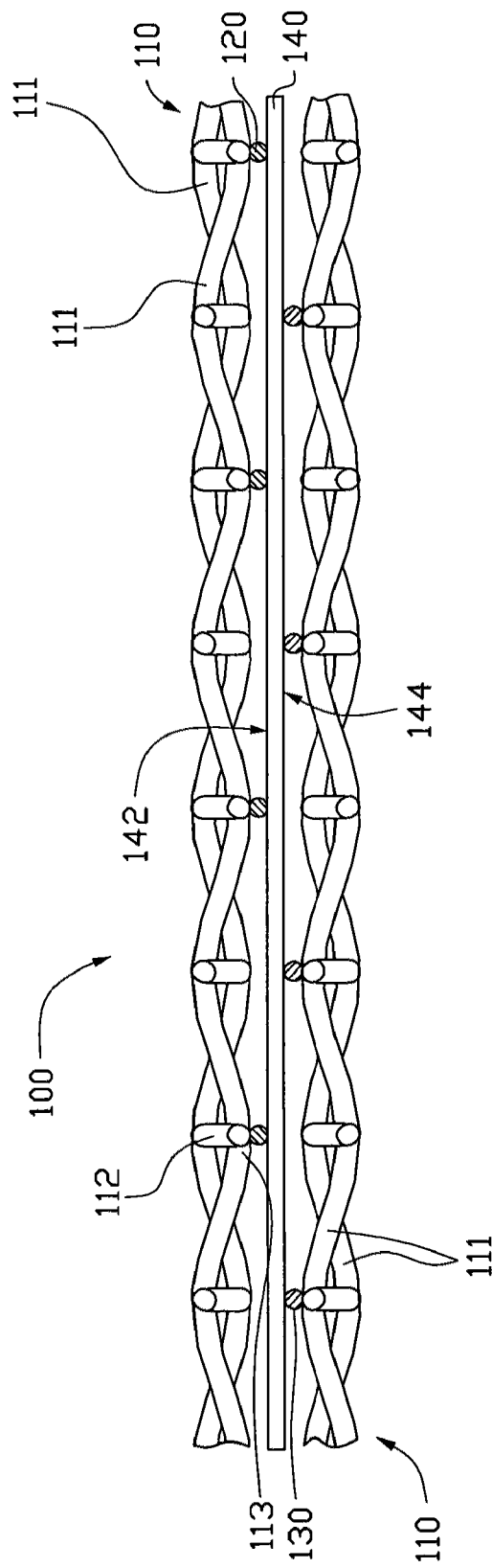
FIG. 1 is a schematic side view of an embodiment of a thermoacoustic device.

Referring to FIG. 1, a thermoacoustic device 100 according to an embodiment includes two networks 110, a plurality of first electrodes 120, a plurality of second electrodes 130, and a sound wave generator 140. The two networks 110 are opposite to each other. The first electrodes 120, the second electrodes 130, and the sound wave generator 140 are disposed between the two networks 110. The sound wave generator 140 has a film like structure with a first surface 142 and a second surface 144. The thickness of the sound wave generator 140 can be very thin. The first electrodes 120 are located on the first surface 142 of the sound wave generator 140 and spaced apart from each other. The second electrodes 130 are located on the second surface 144 of the sound wave generator 140 and spaced apart from each other. By contacting the sound wave generator 140, the first and second electrodes 120, 130 are electrically connected to the sound wave generator 140. The first electrodes 120 and the second electrodes 130 input electrical signals to the sound wave generator 140.

The first and second electrodes 120, 130 can be linear and run along the first and second surfaces 142, 144 respectively. By seeing the sound wave generator 140 as a planar surface, the locations of the first electrodes 120 and the locations of the second electrodes 130 are alternatively arranged on the planar surface as a manner of '+−+−', and are separated from each other. The size of each of the two networks 110 is substantially equal to that of the sound wave generator 140. The plurality of first and second electrodes 120, 130 are substantially uniformly distributed on the first and second surfaces 142, 144 of the sound wave generator 140.

Figure 2:
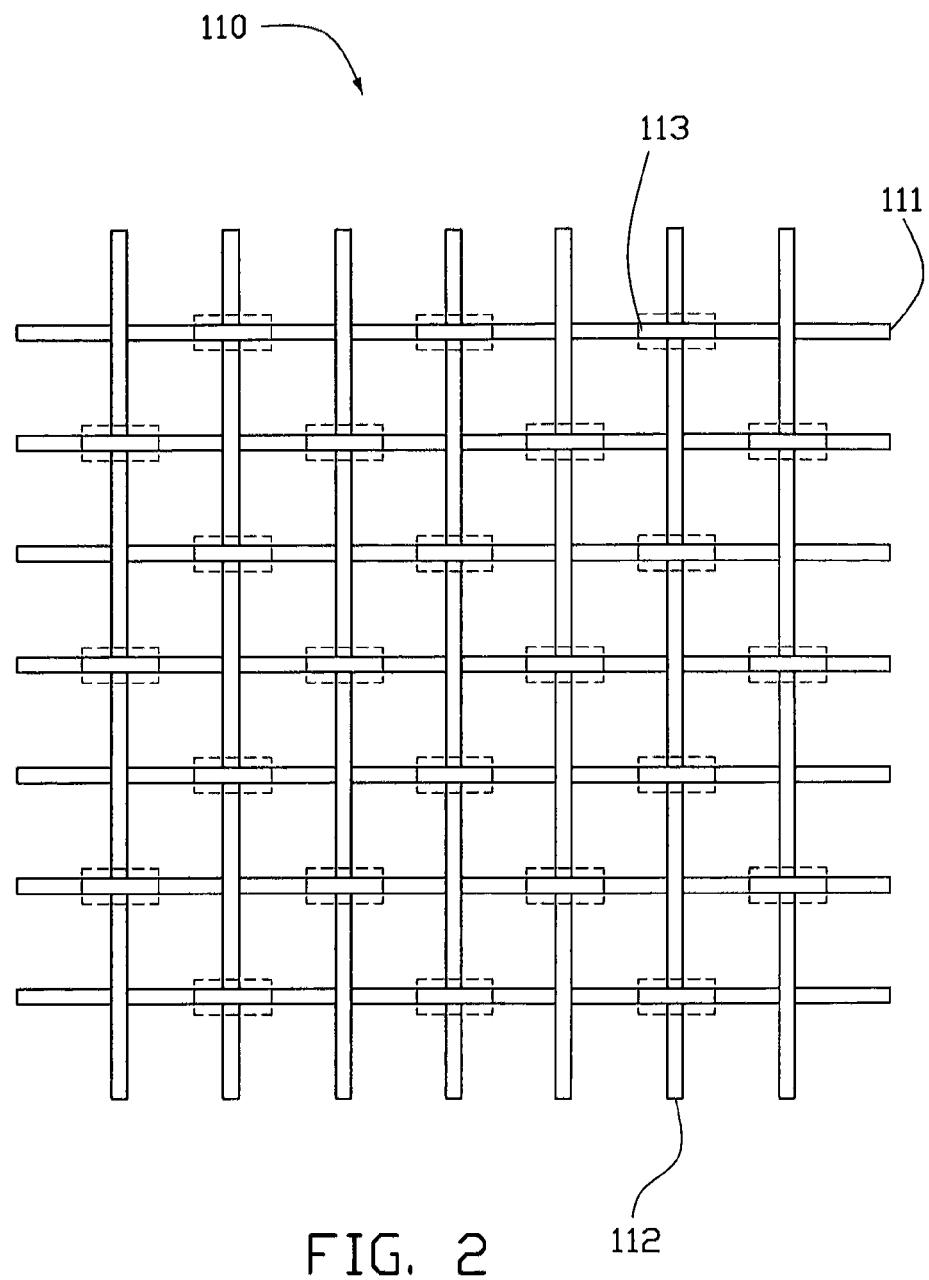
FIG. 2 is a schematic view from a side of a sound wave generator of an embodiment of a network in the thermoacoustic device of FIG. 1.
Figure 3:
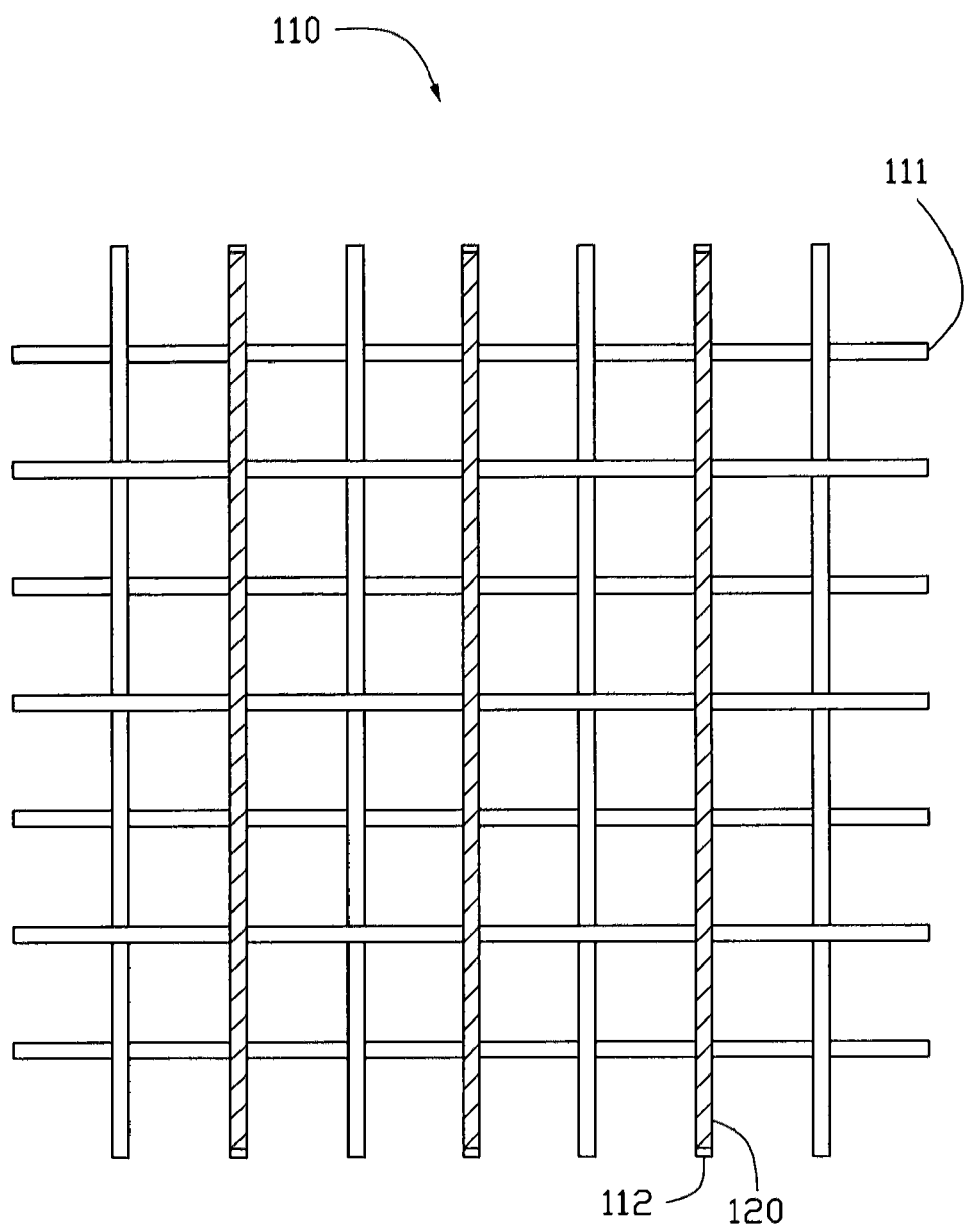
FIG. 3 is a schematic view of the network of FIG. 2 with electrodes thereon.

The two networks 110 have the same structure. The detailed structure of one network 110 is described below. Referring to FIG. 2 and FIG. 3, the network 110 includes a plurality of conducting wires 111 and a plurality of insulating wires 112. The conducting wires 111 and the insulating wires 112 are weaved together and interlaced with each other to form a net structure. In one embodiment, the plurality of conducting wires 111 are substantially parallel to and separated from each other. The distances between every two adjacent conducting wires 111 can be substantially the same. The plurality of insulating wires 112 can be either separated from each other or connected to each other. In one embodiment, the plurality of insulating wires 112 are substantially parallel to and separated from each other. The distances between every two adjacent insulating wires 112 can be substantially the same. It is to be understood that the conducting wires 111 and the insulating wires 112 can be also not weaved together but only intercrossed and adhered with each other.

In the embodiment shown in FIG. 2, the conducting wires 111 are substantially perpendicular to the insulating wires 112. It is to be understood that the network 110 can be a textile or fabrics made by using a method of weaving. The conducting wire 111 and the insulating wire 112 can be respectively used as the warp and the weft during weaving.

The conducing wire 111 is made of conductive material, such as metals, conducting polymers and metallic carbon nanotubes. The insulating wire 112 is made of insulative material, such as plastics, resins, silicone, and so on. The insulating wires 112 can be a normal yarn or tread used in the textiles, such as a plant fiber, animal fiber, wood fiber and mineral fibers. For example, the cotton, twine, wool, silk line, nylon line and spandex can all be used as the insulating wire 112. In one embodiment, the conducting wire 111 is made of metal, and the insulating wire 112 is made of fiber. The conducting wire 111 can have the same material, shape and size with the first and second electrodes 120, 130.

The conducting wires 111 of the two networks 110 can be parallel to each other and corresponding to each other. That is, on the sound wave generator 140, the projections of the conducting wires 111 of one network 110 is coincidence with the projection of the conducting wires 111 of the other network 110.

The insulating wires 112 of the two networks 110 can be parallel to each other and corresponding to each other. That is, the projection of the insulating wires 112 of one network 110 is coincident with the projection of the insulating wires 112 of the other network 110 on the sound wave generator 140.

As shown in FIG. 2, a portion of the conducting wire 111 exposed from the insulating wires 112 can be defined as an electrical connecting portion 113. Each conducting wire 111 comprises of electrical connecting portions 113 which provide contact with electrodes.

The first electrodes 120 are disposed between one network 110 and the first surface 142 of the sound wave generator 140. More specifically, the first electrodes 120 are in electrical contact with the first surface 142 of the sound wave generator 140. In the embodiment shown in FIG. 3, each of first electrodes 120 is parallel to and corresponds to one insulating wire 112. On the planar surface defined by the sound wave generator 140, the insulating wire 112 corresponding to the first electrode 120 is aligned with the first electrode 120. However, not all the insulating wires 112 are corresponding to the first electrodes 120. There can be one insulating wire 112 between any two adjacent first electrodes 120 that is not corresponding to any first electrode 120. Therefore, there can be about half of the amount of the insulating wires 112 do not correspond to a first electrodes 120. It is can be understood that in other embodiments, there can be more than one insulating wire 112 between any two adjacent first electrodes 120 that is not corresponding to any first electrode 120.

The first electrodes 120 are in directly contact with the conducting wires 111 at the electrical connecting portions 113. Each of the first electrodes 120 can be in directly contact with almost all the conducting wires 111 and thereby electrically connecting with almost all the conducting wires 111. All the first electrodes 120 are electrically connected together by the conducting wires 111.

However, only about a half of the amount of the conducting wires 111 are in contact with the first electrodes 120 by the provision of the insulating wires 112. Therefore, the other half of the amount of the conducting wires 111 that are not in contact with the first electrodes 120 can be replaced by the insulating wires 112 as shown in an embodiment of FIG. 5.

Figure 4:
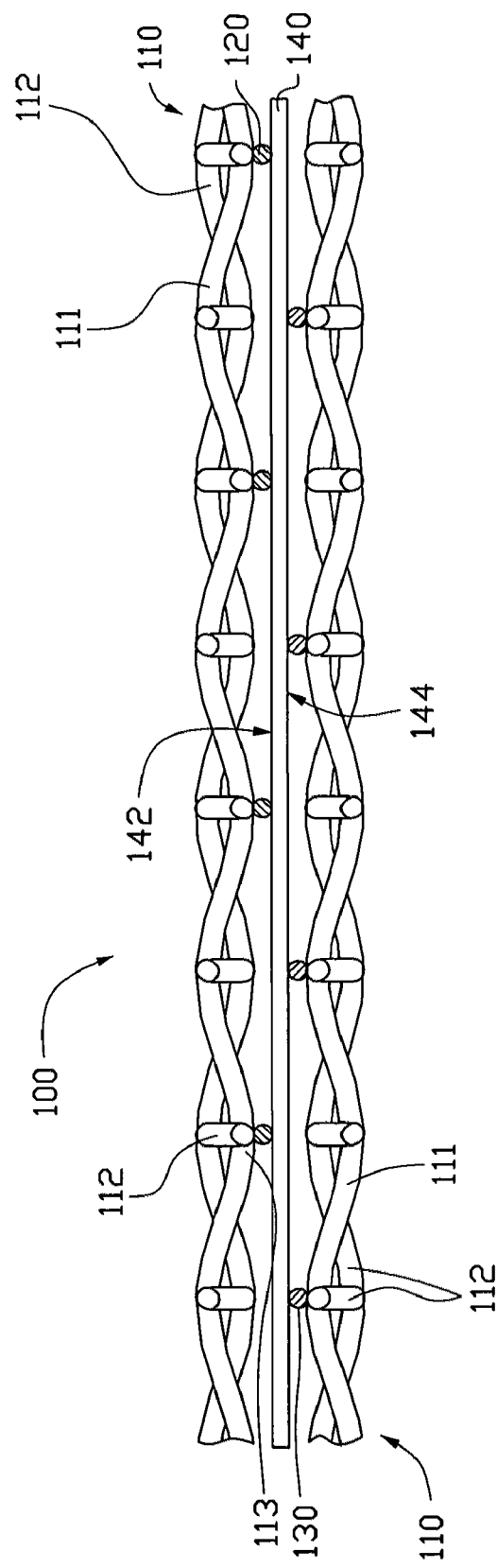
FIG. 4 is a schematic side view of another embodiment of a thermoacoustic device.
Figure 5:
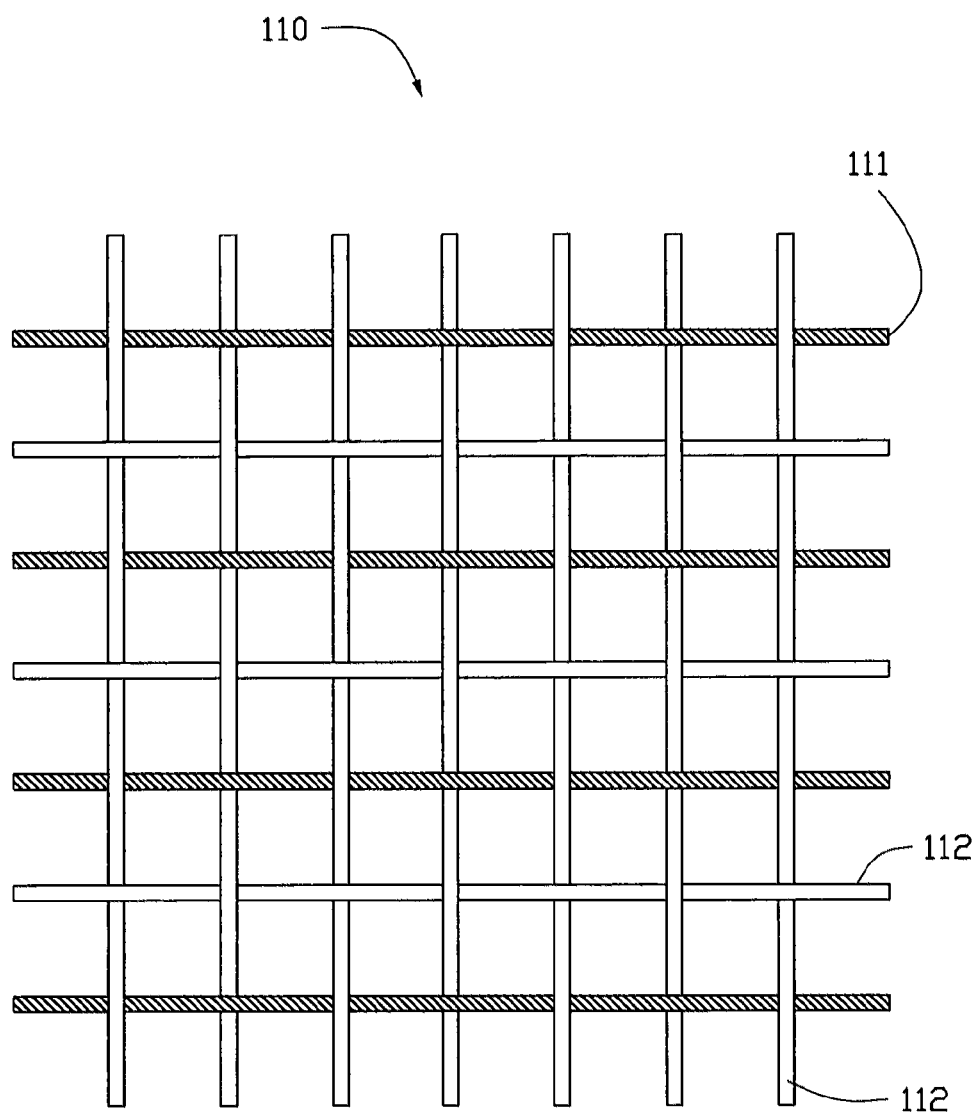
FIG. 5 is a schematic top view of an embodiment of a network in the thermoacoustic device of FIG. 4.

The second electrodes 130 are disposed between the other network 110 and the second surface 144 of the sound wave generator 140. The arrangement of the second electrodes 130 is similar to the first electrodes 120. The second electrodes 130 are in electrical contact with the second surface 144 of the sound wave generator 140. In the embodiment shown in FIG. 1, each of the second electrodes 130 is parallel to and corresponds to one insulating wire 112. There is one insulating wire 112 between any two adjacent second electrodes 130, and this insulating wire 112 does not correspond to any second electrodes 130. The second electrodes 130 are in contact with the conducting wires 111 at the electrical connecting portions 113. All the second electrodes 130 are electrically connected together by the conducting wires 111. Referring to FIG. 4 and FIG. 5, the conducting wires 111 that are not in contact with the first electrodes 120 can be replaced by the insulating wires 112.

The first and second electrodes 120, 130 are made of conductive material such as metals, conductive polymers, metallic carbon nanotubes, and ITO. The first and second electrodes 120, 130 can have a strip shape, rod shape, bar shape, wire shape, or yarn shape. For example, the first and second electrodes 120, 130 can be metal wires, or metal strips. The first and second electrodes 120, 130 can also be strip shaped films or layers that are coated on either the network 110 or the surface 142, 144 of the sound wave generator 140. For example, the first and second electrodes 120, 130 can be silver paste layers.

The sound wave generator 140 is arranged between the first electrodes 120 and the second electrodes 130, and is sandwiched and fixed by the two networks 110. In one embodiment, the sound wave generator 140 is partially supported by the first and/or second electrodes 120, 130. The electrical signal is input by the first and second electrodes 120, 130 and is conducted to the sound wave generator 140. The electrical signal can be an alternative current signal and the conducting direction thereof is changed alternatively.

The sound wave generator 140 has a relatively large specific surface area contacting the surrounding medium, and a relatively small heat capacity per unit area. The sound wave generator 140 includes a carbon nanotube structure. The carbon nanotube structure is constituted by a plurality of carbon nanotubes contacting to each other and substantially uniformly distributed in the carbon nanotube structure.

The carbon nanotubes in the carbon nanotube structure are joined by van der Waals attractive force therebetween to form a free-standing structure. By 'free-standing', it is meant that that the carbon nanotube structure does not have to be supported by a substrate and can sustain the weight of itself when it is hoisted by a portion thereof without tearing.

The carbon nanotube structure can have many different structures and a large specific surface area (e.g., above 50 $m^2/g$). The heat capacity per unit area of the carbon nanotube structure can be less than $2 \times 10^{-4}$ $J/cm^2 \ast K$. In one embodiment, the heat capacity per unit area of the carbon nanotube structure is less than or equal to about $1.7 \times 10^{-6}$ $J/cm^2 \ast K$.

The carbon nanotubes in the carbon nanotube structure can be arranged orderly or disorderly. The term 'disordered carbon nanotube structure' includes a structure where the carbon nanotubes are arranged along many different directions, such that the number of carbon nanotubes arranged along each different direction can be almost the same (e.g. uniformly disordered), and/or entangled with each other. The disordered carbon nanotube structure can be isotropic. 'Ordered carbon nanotube structure' includes a structure where the carbon nanotubes are arranged in a systematic manner, e.g., the carbon nanotubes are arranged approximately along a same direction and or have two or more sections within each of which the carbon nanotubes are arranged approximately along a same direction (different sections can have different directions). It is understood that even ordered carbon nanotube structures can have some variations therein.

The carbon nanotubes in the carbon nanotube structure can be single-walled, double-walled, or multi-walled carbon nanotubes. It is also understood that there may be many layers of ordered and/or disordered carbon nanotube films in the carbon nanotube structure.

The carbon nanotube structure may have a substantially planar structure. The thickness of the carbon nanotube structure may range from about 0.5 nanometers to about 1 millimeter. The carbon nanotube structure can also be a wire with a diameter ranged from about 0.5 nanometers to about 1 millimeter. The larger the specific surface area of the carbon nanotube structure, the smaller the heat capacity per unit area will be. The smaller the heat capacity per unit area, the higher the sound pressure level of the sound produced by the sound wave generator 140.

The carbon nanotube structure can include at least one carbon nanotube film.

Figure 6:
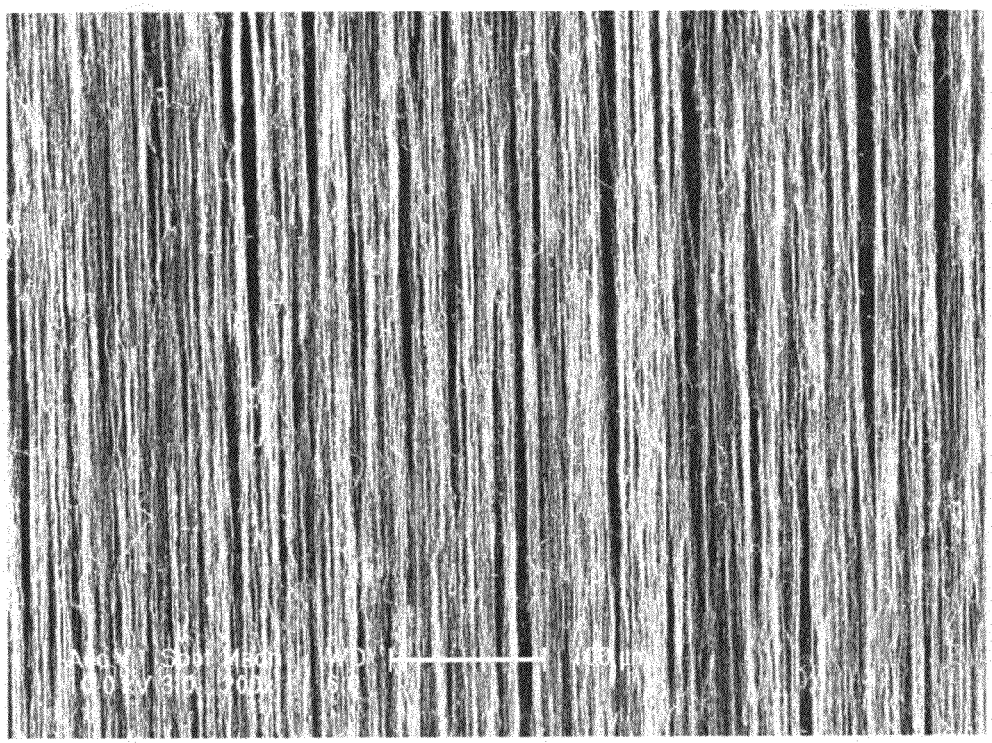
FIG. 6 shows a Scanning Electron Microscope (SEM) image of a drawn carbon nanotube film.
Figure 7:
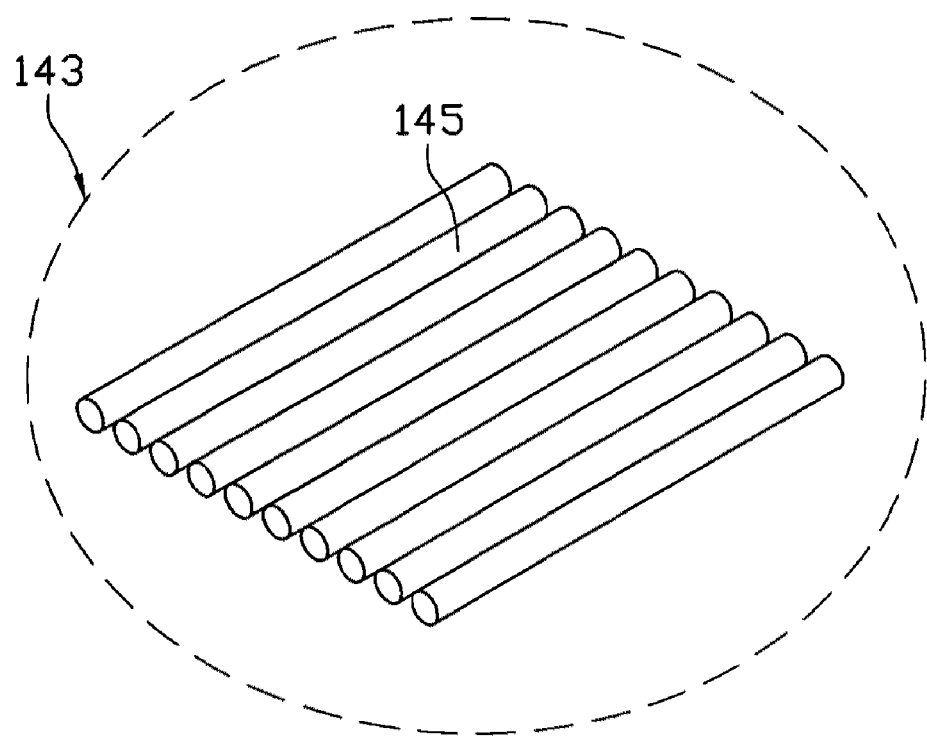
FIG. 7 is a schematic structural view of a carbon nanotube segment.

In one embodiment, the carbon nanotube structure can include at least one drawn carbon nanotube film. The drawn carbon nanotube film includes a plurality of successive and oriented carbon nanotubes joined end-to-end by van der Waals attractive force therebetween. The carbon nanotubes in the carbon nanotube film can be substantially aligned in a single direction. The drawn carbon nanotube film can be a free-standing film. The drawn carbon nanotube film can be formed by drawing a film from a carbon nanotube array that is capable of having a film drawn therefrom. Referring to FIG. 6 and FIG. 7, each drawn carbon nanotube film includes a plurality of successively oriented carbon nanotube segments 143 joined end-to-end by van der Waals attractive force therebetween. Each carbon nanotube segment 143 includes a plurality of carbon nanotubes 145 parallel to each other, and joined by van der Waals attractive force therebetween. As can be seen in FIG. 6, some variations can occur in the drawn carbon nanotube film. The carbon nanotubes 145 in the drawn carbon nanotube film are also oriented along a preferred orientation. The carbon nanotube film also can be treated with a volatile organic solvent. After that, the mechanical strength and toughness of the treated carbon nanotube film are increased and the coefficient of friction of the treated carbon nanotube films is reduced. The treated carbon nanotube film has a larger heat capacity per unit area and thus produces less of a thermoacoustic effect than the same film before treatment. A thickness of the carbon nanotube film can range from about 0.5 nanometers to about 100 micrometers. The thickness of the drawn carbon nanotube film can be very thin and thus, the heat capacity per unit area will also be very low. The single drawn carbon nanotube film has a specific surface area of above about 100 $m^2/g$. In one embodiment, the drawn carbon nanotube film has a specific surface area ranged from 200 $m^2/g$ to 2600 $m^2/g$. The specific surface area of the drawn carbon nanotube film is tested by a Brunauer-Emmet-Teller (BET) method. In one embodiment, the drawn carbon nanotube film has a specific weight of about 0.05 $g/m^2$.

The carbon nanotube structure of the sound wave generator 140 can also include at least two stacked carbon nanotube films. In some embodiments, the carbon nanotube structure can include two or more coplanar carbon nanotube films. These coplanar carbon nanotube films can also be stacked one upon other films. Additionally, an angle can exist between the orientation of carbon nanotubes in adjacent films, stacked and/or coplanar. Adjacent carbon nanotube films can be combined only by the van der Waals attractive force therebetween and without the use of an adhesive. The number of the layers of the carbon nanotube films is not limited. However, as the stacked number of the carbon nanotube films increases, the specific surface area of the carbon nanotube structure will decrease, and a large enough specific surface area (e.g., above 50 $m^2/g$) must be maintained thereby achieving sufficient sound volume. An angle between the aligned directions of the carbon nanotubes in the two adjacent carbon nanotube films can range from 0 degrees to about 90 degrees. Spaces are defined between two adjacent and side-by-side carbon nanotubes in the drawn carbon nanotube film. When the angle between the aligned directions of the carbon nanotubes in adjacent carbon nanotube films is larger than 0 degrees, a microporous structure is defined by the carbon nanotubes in the sound wave generator 140. The carbon nanotube structure in an embodiment employing these films will have a plurality of micropores. Stacking the carbon nanotube films will add to the structural integrity of the carbon nanotube structure.

In one embodiment, the carbon nanotubes in the carbon nanotube structure are substantially aligned along a direction from the first electrodes 120 to the second electrodes 130. When the first electrodes 120 are parallel to the second electrodes 130, the aligned direction of the carbon nanotubes are substantially perpendicular to the first electrodes 120 and the second electrodes 130.

In other embodiments, the carbon nanotube structure includes a flocculated carbon nanotube film. The flocculated carbon nanotube film can include a plurality of long, curved, disordered carbon nanotubes entangled with each other. A length of the carbon nanotubes can be above 10 centimeters. Further, the flocculated carbon nanotube film can be isotropic. The carbon nanotubes can be substantially uniformly dispersed in the carbon nanotube film. The adjacent carbon nanotubes are acted upon by the van der Waals attractive force therebetween, thereby forming an entangled structure with micropores defined therein. It is understood that the flocculated carbon nanotube film is very porous. Sizes of the micropores can be less than 10 micrometers. The porous nature of the flocculated carbon nanotube film will increase specific surface area of the carbon nanotube structure. Further, due to the carbon nanotubes in the carbon nanotube structure being entangled with each other, the carbon nanotube structure employing the flocculated carbon nanotube film has excellent durability, and can be fashioned into desired shapes with a low risk to the integrity of carbon nanotube structure. Thus, the sound wave generator 140 may be formed into many shapes. The flocculated carbon nanotube film, in some embodiments, will not require the use of structural support due to the carbon nanotubes being entangled and adhered together by van der Waals attractive force therebetween. The thickness of the flocculated carbon nanotube film can range from about 0.5 nanometers to about 1 millimeter. It is also understood that many of the embodiments of the carbon nanotube structure are flexible and/or do not require the use of structural support to maintain their structural integrity.

The carbon nanotube structure includes a plurality of carbon nanotubes and has a small heat capacity per unit area and can have a large area for causing the pressure oscillation in the surrounding medium by the temperature waves generated by the sound wave generator 140. In use, when electrical signals, with variations in the application of the signal and/or strength are input applied to the carbon nanotube structure of the sound wave generator 140, heating and variations of heating are produced in the carbon nanotube structure according to the signal. Variations in the signals (e.g. digital, change in signal strength), will create variations in the heating. Temperature waves are propagated into surrounding medium. The temperature waves in the medium cause pressure waves to occur, resulting in sound generation. In this process, it is the thermal expansion and contraction of the medium in the vicinity of the carbon nanotube structure that produces sound. This is distinct from the mechanism of the conventional sound wave generator, in which the pressure waves are created by the mechanical movement of the diaphragm. The operating principle of the sound wave generator 140 is an "electrical-thermal-sound" conversion.

Figure 8:
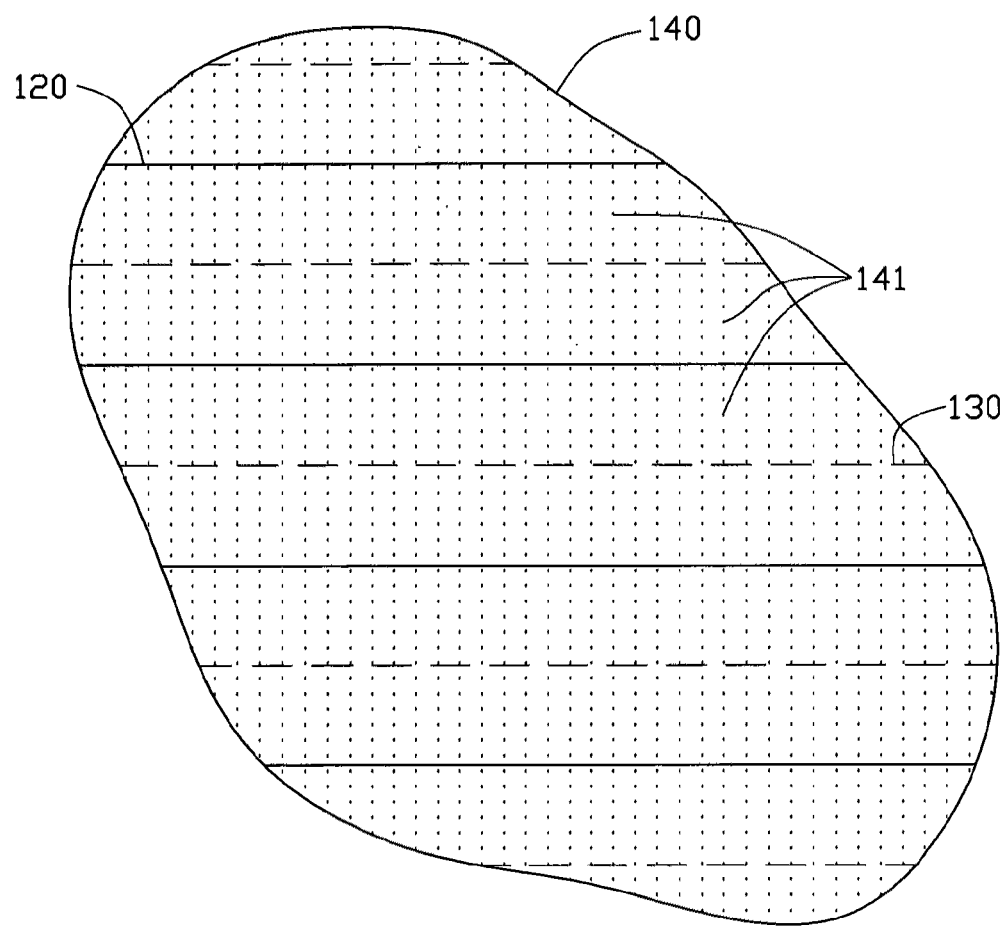
FIG. 8 is a schematic top view of an arrangement of the first and second electrodes in the thermoacoustic device of FIG. 1 after a freely cutting.
Figure 9:
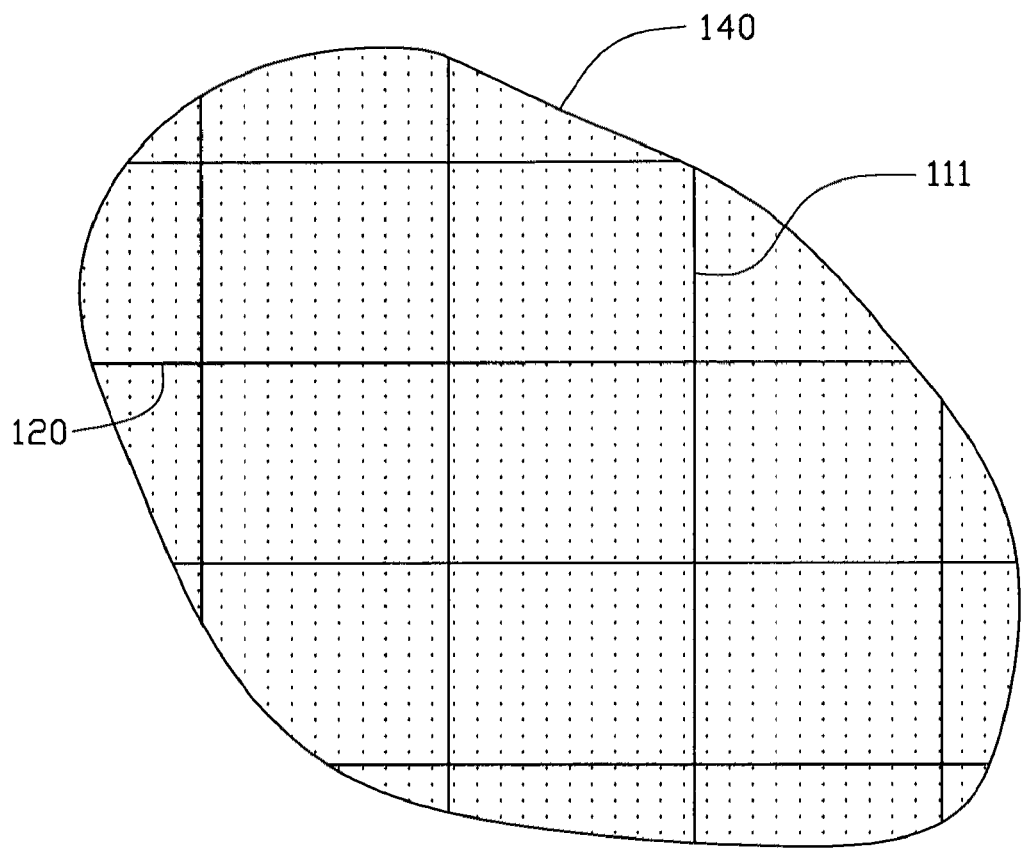
FIG. 9 is a schematic top view of an arrangement of the conducting wires in the thermoacoustic device of FIG. 1 after the freely cutting.

Referring to FIG. 8 and FIG. 9, in one embodiment of the thermoacoustic device 100, the first electrodes 120 and the second electrodes 130 are parallel to each other, and a distance between any first electrodes 120 to the adjacent second electrodes 130 is equal to each other. The sound wave generator 140 is divided into a plurality of thermoacoustic elements 141 with the same width by the first electrodes 120 and the second electrodes 130. Each thermoacoustic element 141 has one first electrode 120 and one second electrode 130 connected thereto at two ends. All the first electrodes 120 are electrically connected together, and have the same electric potential value. All the second electrodes 130 are electrically connected together, and have the same electric potential value. When an electrical signal is input from one first electrode 120, the electrical signal is conducted through all the thermoacoustic elements 141 by all the first electrodes 120, and then reaches to all the second electrodes 130, vice versa. Thereby, all the thermoacoustic elements 141 are connected in parallel. By connecting any one first electrode 120 and any one second electrode 130 respectively to the two terminals of an amplifier to form a loop, the electrical signals input from the amplifier can drive the sound wave generator 140 by all the first and second electrodes 120, 130 to emit sounds. It is to be understood that, the thermoacoustic device 100 can also work if the conducting wires 112 of the two networks 110 in contact with the first electrodes 120, and second electrodes 130 are separately connected to the two terminals of the amplifier.

When the thermoacoustic device 100 is cut into piece, a part of the thermoacoustic device 100 is removed. However, in the remaining piece of the thermoacoustic device 100, the remaining first electrodes 120 are connected to each other and the second electrodes 130 are connected to each other. Therefore, the remaining piece of the thermoacoustic device 100 can still function. Though the area of the sound wave generator 140 decreases after the cutting, the sound wave generator 140 does not lose the sound emitting ability. Therefore, the thermoacoustic device 100 can be freely cut, as long as a part of the first electrodes 120 and a part of the second electrodes 130 still remain. The thermoacoustic device 100 can be cut into desired pattern and area.

Further, the sound wave generator 140 is protected by the two networks 110, thereby avoid being destroyed. The thermoacoustic device 100 is flexible and can be mass produced to an extremely large size, rolled up into a coil, and cut off a desired piece to use like a textile.

Figure 10:
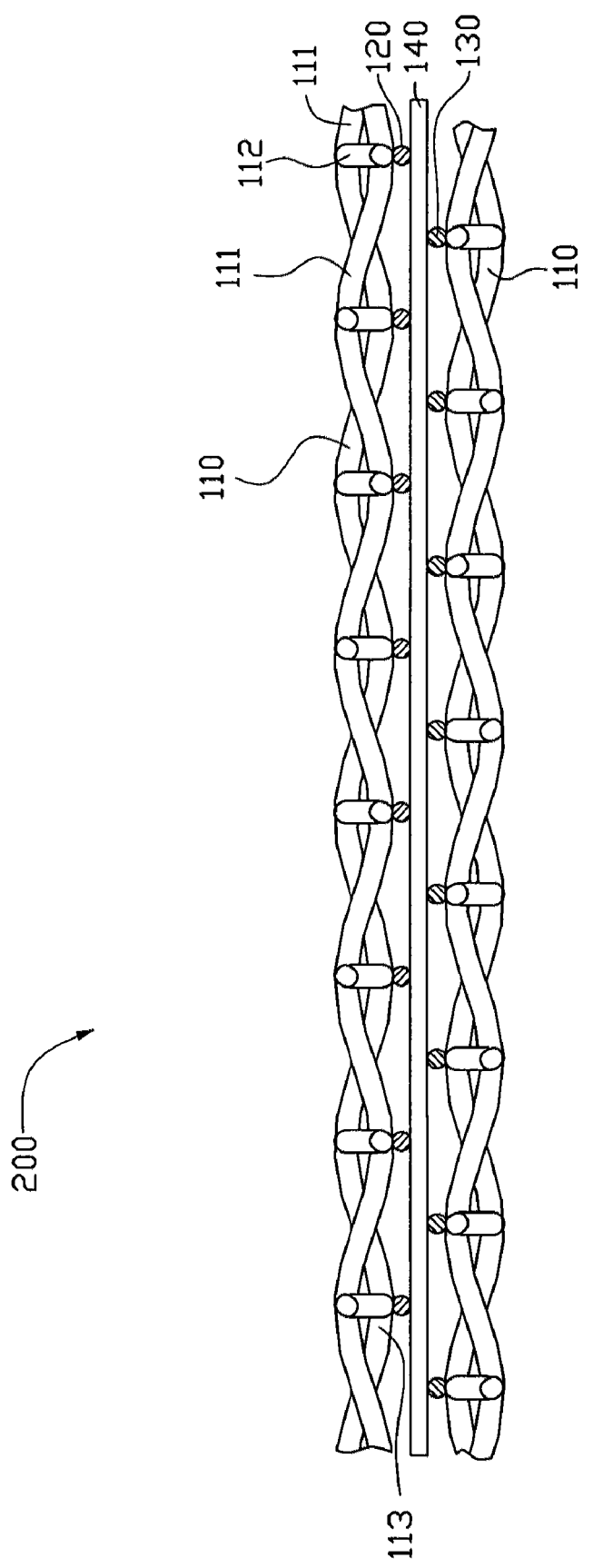
FIG. 10 is a schematic side view of another embodiment of a thermoacoustic device.

Referring to FIG. 10, according to a second embodiment, the thermoacoustic device 200 also includes the two networks 110, the plurality of first electrodes 120, the plurality of second electrodes 130, and the sound wave generator 140. The conducting wires 111 in the two networks 110 can be parallel to each other. However, on the planar surface defined by the sound wave generator 140, the projections of the conducting wires 111 of one network 110 and the projection of the conducting wires 111 of the other network 110 are not coincident with but separated from each other.

The locations of the conducting wires 111 of one network 110 and the locations of the conducting wires 111 of the other network 110 are alternatively arranged on the planar surface of the sound wave generator 140 as a manner of '+−+−', and are separated from each other.

In one network 110, all the insulating wires 112 runs along the length with the first electrodes 120 in one to one manner, and all the conducting wires 111 are in contact with the first electrodes 120. In the other network 110, all the insulating wires 112 are covered by the second electrodes 130 in one to one manner, and all the conducting wires 111 are in contact with the second electrodes 130. That is, each insulating wire 112 runs along the length of either one first electrode 120 or one second electrode 130. Therefore, the locations of the first electrodes 120 and the locations of the second electrodes 130 are alternatively arranged on the sound wave generator 140 as a manner of '+−+−', and are separated from each other.

The thermoacoustic device 200 can work if any one conducting wire 111 of one network 110 and any one conducting wire 111 of the other network 110 are separately connected to the two terminals of the amplifier.

Figure 11:
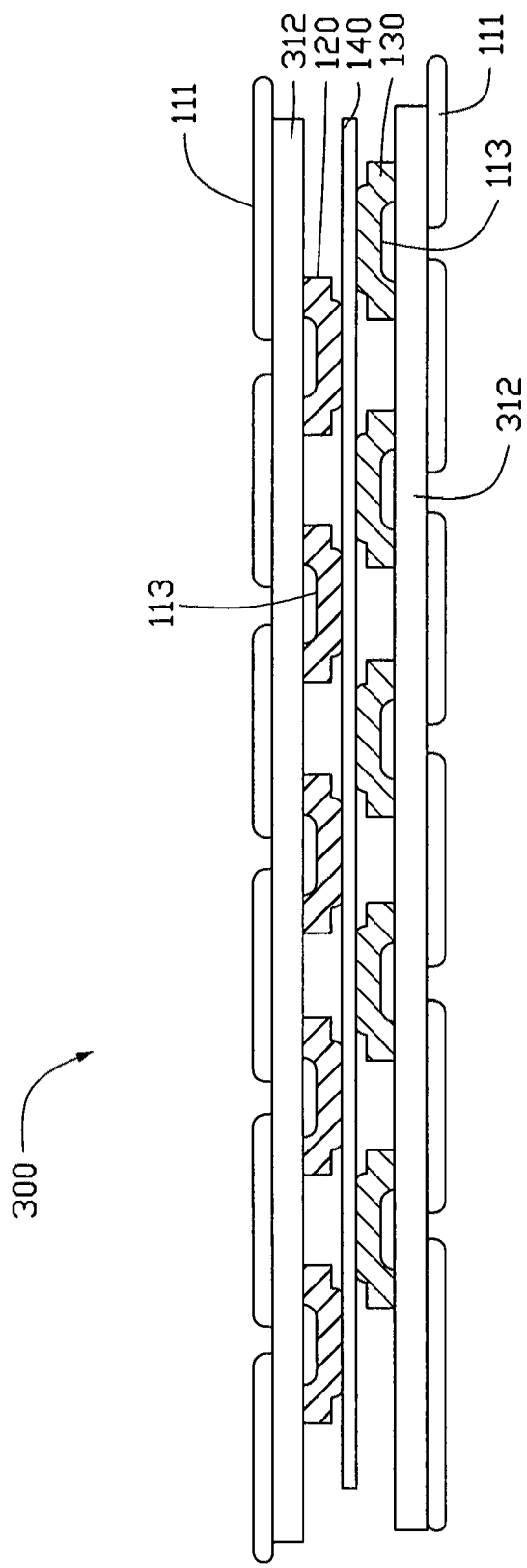
FIG. 11 is a schematic side view of another embodiment of a thermoacoustic device.
Figure 12:
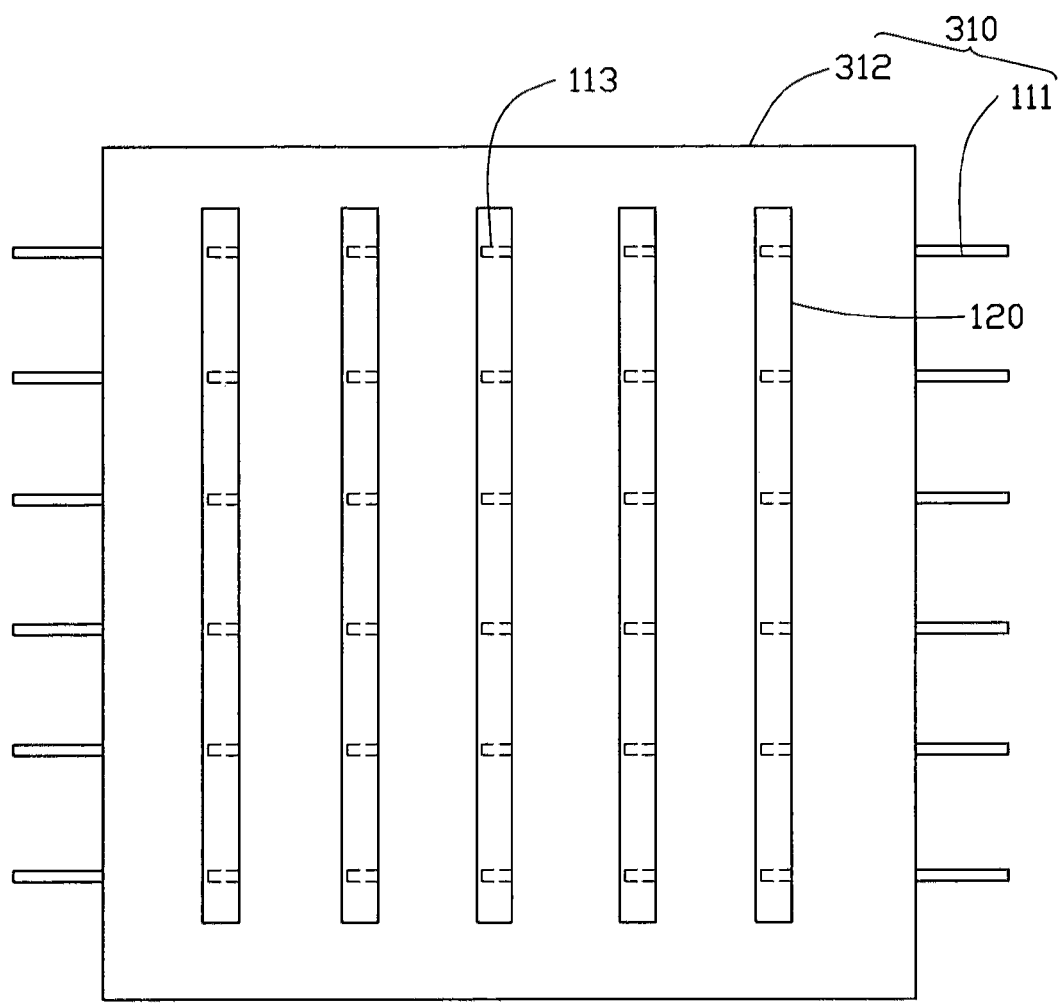
FIG. 12 is a schematic structural view from the side of the sound wave generator of an embodiment of a network in the thermoacoustic device of FIG. 11.

Referring to FIG. 11 and FIG. 12, according to another embodiment, a thermoacoustic device 300 can include the two networks 310, the first electrodes 120, the sound wave generator 140 and the second electrodes 130. The network 310 has an insulating fabric 312 such as a cloth or an insulating net. The network 310 further includes a plurality of conducting wires 111 that are sewed in the fabric 312, parallel and separated from each other. The portion of the conducting wire 111 exposed from the insulating fabric 312 and directly opposite the sound wave generator 140 can be defined as the electrical connecting portion 113. In one network 310, the electrically connecting portions 113 are in contact with the first electrodes 120. In the other network 310, the electrically connecting portions 113 are in contact with by the second electrodes 130. The first and second electrodes 120, 130 can be silver paste layers coated on the insulating fabrics 312. The two networks 310 are arranged so that on the sound wave generator 140, the locations of the first electrodes 120 and the locations of the second electrodes 130 are alternatively arranged as the manner of and are separated from each other.

Figure 13:
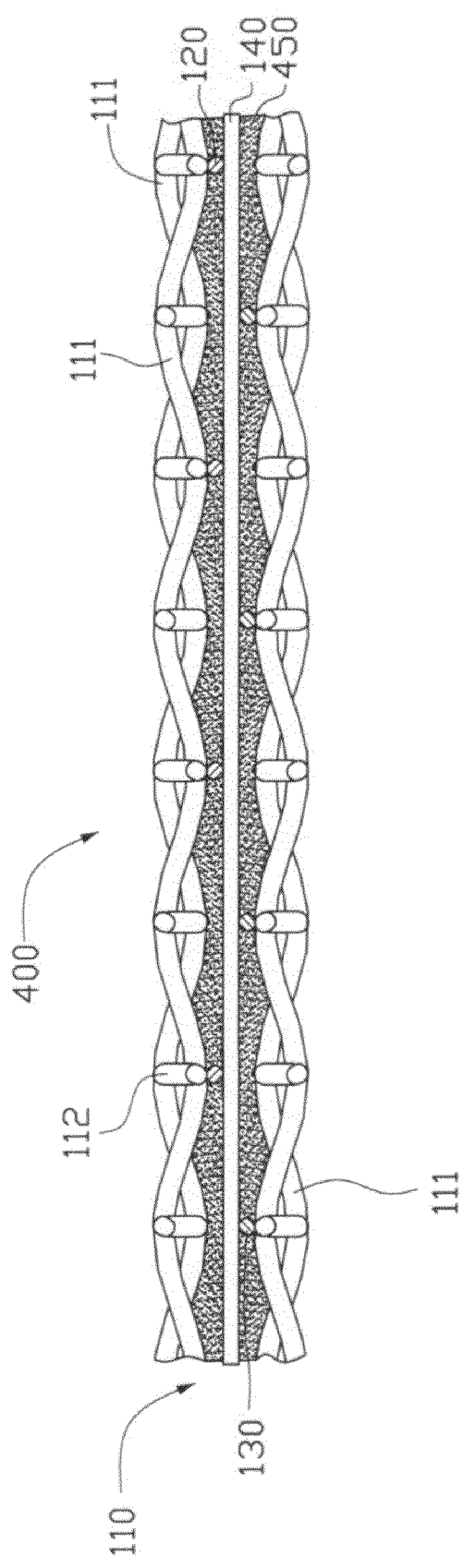
FIG. 13 is a schematic side view of another embodiment of a thermoacoustic device.
Figure 14:
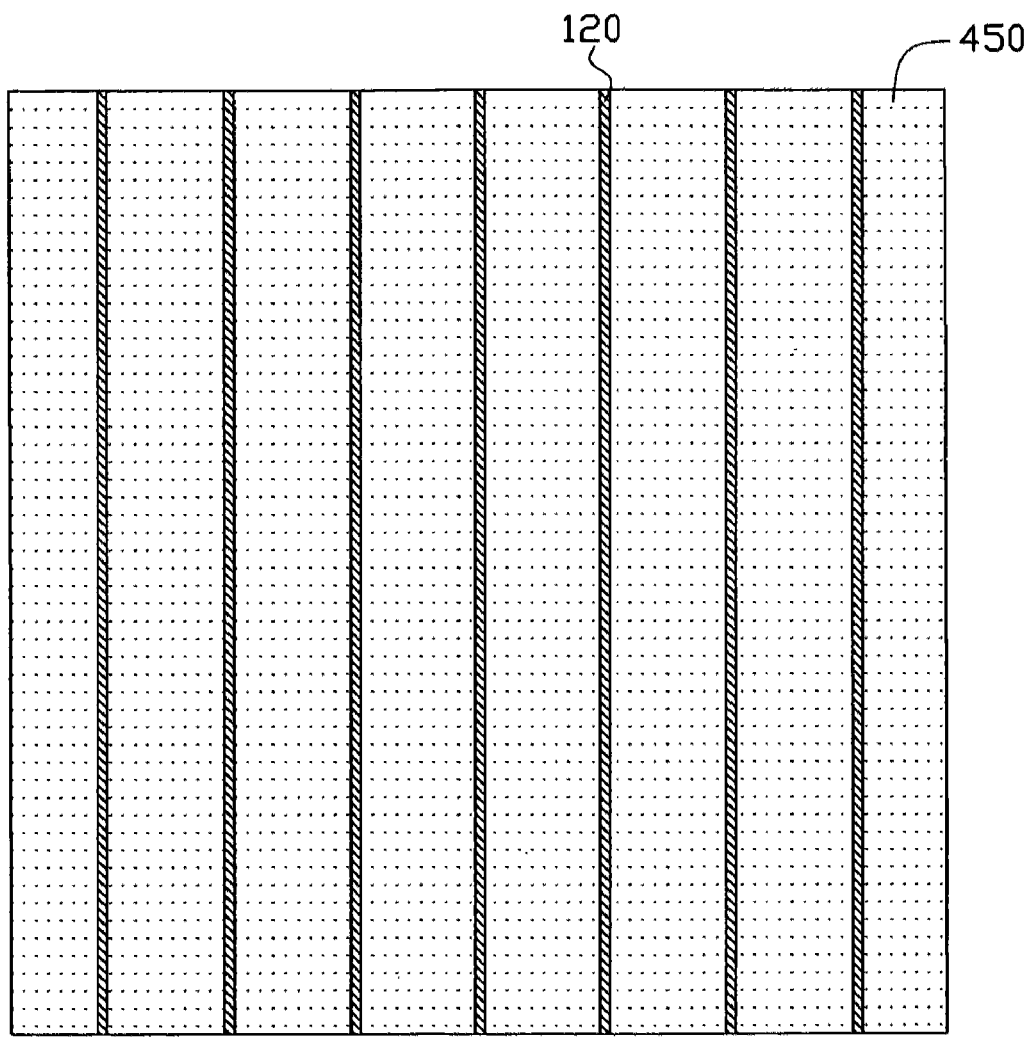
FIG. 14 is a schematic structural view from the side of the sound wave generator of an insulating layer and the first electrode exposed from the insulating layer in the thermoacoustic device of FIG. 13.

Referring to FIG. 13 and FIG. 14, according to another embodiment, a thermoacoustic device 400 further includes at least one insulating layer 450. The insulating layer 450 is disposed between the network 110 and the sound wave generator 140. The thermoacoustic device 400 can also include two insulating layers 450, where one insulating layer 450 disposed between each network 110 and the sound wave generator 140. However, at least a part of the surface of the first electrodes 120 and the second electrodes 130 are exposed from the insulating layers 450 and in contact with the sound wave generator 140. The insulating layer 450 covers the entire surface of one network 110 that is opposite to the sound wave generator 140 except the first or second electrodes 120, 130. Thus, one insulating layer 450 is disposed between any two adjacent first electrodes 120, and the other insulating layer 450 is disposed between any two adjacent second electrodes 130.

The insulating layer 450 can be made of insulating material that can endure a relatively high temperature. The material of the insulating layer 450 can be plastic, resin, or glass fibers. The insulating layer 450 can has a plurality of micropores to increase the contacting area of the sound wave generator 140 to the surrounding medium such as air.

It is to be understood that, the insulating layer 450 can provide a separation between the networks 110 and the sound wave generator 140 even when the thermoacoustic device 400 is deformed such as folded, curved, wrapped, or cut.

The insulating layer 450 can be formed by coating a layer of insulating material on the first and second electrodes 120, 130 and the network 110. Then, the insulating layer 450 can be polished thereby exposing the electrodes 120, 130 therefrom.

By using the insulating layer 450, the material of the insulating wires 112 can be replaced by conducting wires 111.

In another embodiment, the networks can be weaved all by the conducting wires 111 each has an insulating layer covered thereon. For example, the structure of the thermoacoustic device can be similar to the structure shown in FIG. 1 or FIG. 2, however, the insulating wires 112 are replaced by the conducting wires 111, and the outer surface of the conducting wires 111 is covered by the insulating layer to form a structure like weaved cables. However, at the contacting points between the conducting wires 111 and the electrodes 120, 130, the conducting wires 111 should be exposed from the insulating layer to electrically connect with the electrodes 120, 130. Thereby, all the first electrodes 120 are electrically connected therebetween by one network, and all the second electrodes 130 are electrically connected therebetween by the other network. The networks are insulated except the contacting points to the first and second electrodes 120, 130. To form this structure, the network weaved all by the conducting wires 111 with the first electrodes 120 thereon can be disposed into a melting resin or plastic, and then took out to cure the resin or plastic. Thus, the entire surface of the networks and the first electrodes 120 is covered by the insulating layer. However the conducting wires 111 and the first electrodes 120 are electrically connected inside. The other network with the second electrodes 130 can be formed by the same method. A polishing step can be used to expose the top surface of the first electrodes 120 and the second electrodes 130 to electrically connect with the sound wave generator 140. In this embodiment, the aligned direction of the electrodes 120, 130 can be set as desired.

It is to be understood that the above-described embodiments are intended to illustrate rather than limit the invention. Any elements described in accordance with any embodiments is understood that they can be used in addition or substituted in other embodiments. Embodiments can also be used together. Variations may be made to the embodiments without departing from the spirit of the invention. The above-described embodiments illustrate the scope of the invention but do not restrict the scope of the invention.

What is claimed is:

1. A thermoacoustic device comprising:
   a sound wave generator comprising of a first surface and a second surface;
   a plurality of first electrodes disposed on the first surface;
   a plurality of second electrodes disposed on the second surface, the first electrodes and the second electrodes are alternately arranged; and
   a first network and a second network, each of the first network and the second network comprises of a plurality of conducting wires, the plurality of first electrodes are connected together by the plurality of conducting wires in the first network, the plurality of second electrodes are connected together by the plurality of conducting wires in the second network;
   wherein the plurality of first electrodes and the plurality of second electrodes transmit an electrical signal to the sound wave generator, the sound wave generator converts the electrical signal into heat, and the heat transfers to a surrounding medium in contact with the sound wave generator to cause a thermoacoustic effect.

2. The thermoacoustic device of claim 1, wherein the plurality of first electrodes are parallel to the plurality of second electrodes.

3. The thermoacoustic device of claim 1, wherein distances between any two adjacent first electrodes are the same, and a distance between any two adjacent second electrodes are the same.

4. The thermoacoustic device of claim 1, wherein each of the first network and the second network further comprises a plurality of insulating wires, the plurality of conducting wires and the plurality of insulating wires are weaved together to form the first network and the second network respectively.

5. The thermoacoustic device of claim 4, wherein the plurality of conducting wires in the first network are parallel to each other.

6. The thermoacoustic device of claim 5, wherein the plurality of insulating wires are parallel to each other and perpendicular to the plurality of conducting wires in first network.

7. The thermoacoustic device of claim 1, wherein heat capacity per unit area of the sound wave generator is less than $2\times10^{-4}$ J/cm$^2$*K.

8. The thermoacoustic device of claim 1, wherein the sound wave generator is partially supported by the plurality of first electrodes, the plurality of second electrodes or a combination thereof.

9. The thermoacoustic device of claim 1, wherein the sound wave generator comprises of at least one carbon nanotube film.

10. The thermoacoustic device of claim 9, wherein the at least one carbon nanotube film comprises a plurality of carbon nanotubes joined end-to-end by Van der Waals attractive force.

11. The thermoacoustic device of claim 10, wherein the plurality of carbon nanotubes are substantially aligned along a direction from the first electrodes to the second electrodes.

12. The thermoacoustic device of claim 1, further comprising a first insulating layer disposed between the first network and the sound wave generator, and a second insulating layer disposed between the second network and the sound wave generator.

13. The thermoacoustic device of claim 12, wherein the first insulating layer is disposed between any two adjacent first electrodes, and the second insulating layer is disposed between any two adjacent second electrodes.

14. The thermoacoustic device of claim 12, wherein the first insulating layer and the second insulating layer are in contact with the sound wave generator.

15. The thermoacoustic device of claim 1, wherein the first network and the second network comprise an insulating fabric, the conducting wires are located in the insulating fabric.

16. A thermoacoustic device comprising:
a sound wave generator comprising a first surface and a second surface;
a plurality of first electrodes disposed on the first surface;
a plurality of second electrodes disposed on the second surface, the first electrodes and the second electrodes are alternately arranged on the sound wave generator; and
a plurality of parallel conducting wires and a plurality of parallel insulating wires substantially perpendicular to the conducting wires and woven together to form a first network and a second network;
wherein the plurality of first and second electrodes are attached to the plurality of parallel conducting wires, at least one conducting wire of any two adjacent conducting wires is insulated from the first and second electrodes, the plurality of first electrodes and the plurality of second electrodes transmit an electrical signal to the sound wave generator, the sound wave generator converts the electrical signal into heat, and the heat transfers to a medium in contact with the sound wave generator to cause a thermoacoustic effect.

17. The thermoacoustic device of claim 16, wherein the sound wave generator is a carbon nanotube film consisting of a plurality of carbon nanotubes joined end-to-end by Van der Waals attractive force.

18. A thermoacoustic device comprising:
a sound wave generator comprising of a first surface and a second surface;
a plurality of first electrodes disposed on the first surface;
a plurality of second electrodes disposed on the second surface, the first electrodes and the second electrodes are alternately arranged; and
a first network and a second network, each of the first network and the second network comprises of a plurality of conducting wires, the plurality of first electrodes are connected together by the plurality of conducting wires in the first network, the plurality of second electrodes are connected together by the plurality of conducting wires in the second network;
wherein the sound wave generator comprises of at least one carbon nanotube film, the at least one carbon nanotube film comprises a plurality of carbon nanotubes substantially aligned along a direction from the first electrodes to the second electrodes.

* * * * *